Aug. 27, 1963   E. E. HESTON   3,101,511
EXTRUDER
Filed Aug. 10, 1961
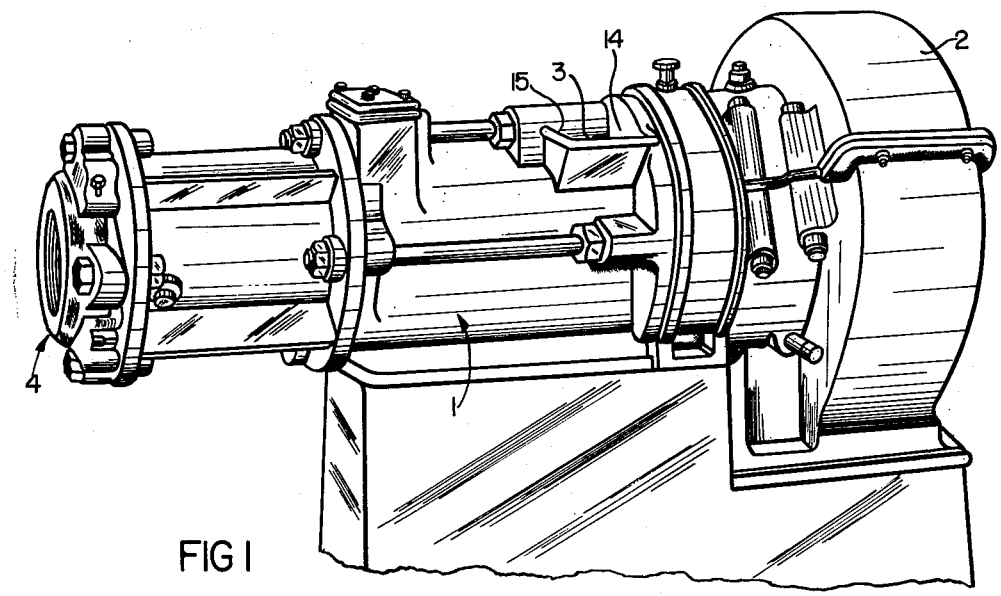
FIG 1
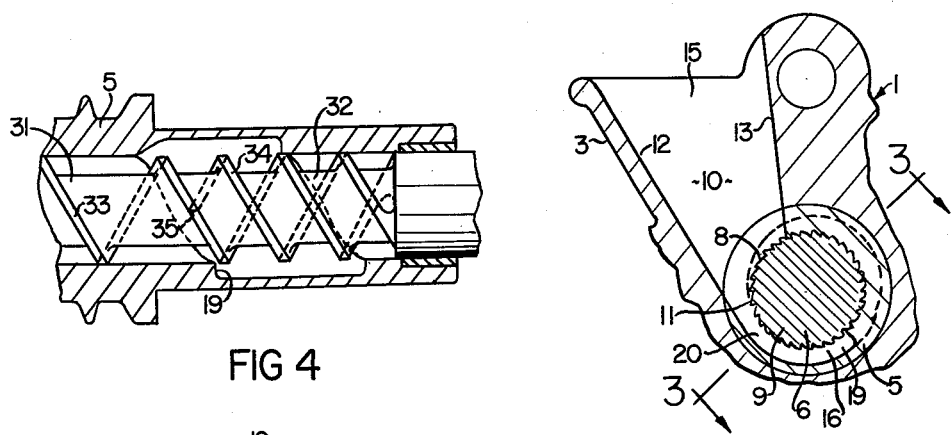
FIG 4
FIG 2
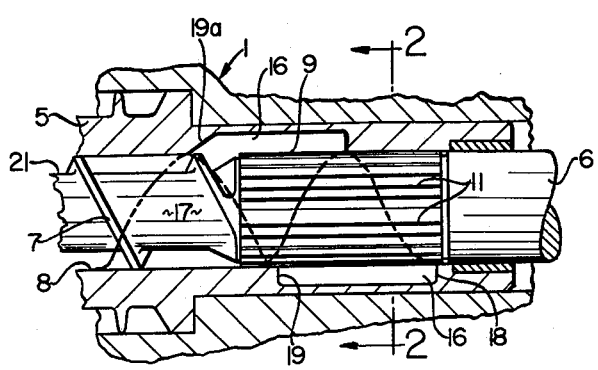
FIG 3
INVENTOR.
EUGENE E. HESTON
BY
Oberlin, Maky & Donnelly
ATTORNEYS

United States Patent Office 3,101,511
Patented Aug. 27, 1963

3,101,511
EXTRUDER
Eugene E. Heston, Akron, Ohio, assignor to National Rubber Machinery Company, Akron, Ohio, a corporation of Ohio
Filed Aug. 10, 1961, Ser. No. 130,518
6 Claims. (Cl. 18—12)

The present invention relates generally as indicated to an extruder and more particularly to improvements in the feed end of a screw type extruder.

Heretofore, considerable difficulty has been encountered in the feeding of certain materials such as strip-fed rubbers and low shear strength plastic materials into extruders. Such materials instead of being propelled forwardly into the extruder from the feed box, move around the screw in the feed hopper, thereby blocking the feed passage. As a result, such material builds up in the hopper and moves downstream through the extruder in chunks rather than continuously and smoothly. As evident, such surge and uneven flow of the material as it is delivered from the die of the extruder, results in an end product which is not of desired quality and uniformity.

Accordingly, it is a principal object of this invention to provide an extruder feed hopper which induces smooth and continuous flow of the material into and through the extruder without such build-up of material in the hopper and the consequent surging and uneven flow of the material from the die end of the extruder.

It is another object of this invention to provide an extruder having a helical channel leading from the throat of the feed passage as defined by the feed hopper and a non-propelling or "turning" section of the feed screw to the working and propelling section of the feed screw which is axially offset from the feed passage throat. In this way, material in the feed passage tending to rotate with the non-propelling, turning section of the feed screw is advanced helically through said channel from the feed hopper into the barrel or cylinder of the extruder, wherefrom it is uniformly advanced and worked by the helical flight of the working and propelling section of the feed screw.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a perspective view of an extruder embodying the present invention;

FIG. 2 is a transverse cross-section view on enlarged scale taken through the feed box as represented by the line 2—2, FIG. 3;

FIG. 3 is a longitudinal section taken substantially along the line 3—3, FIG. 2; and FIG. 4 is a longitudinal section showing another embodiment of the invention.

Referring now in detail to the drawing, and first to FIG. 1, the extruder herein comprises a cylinder assembly 1 in which a feed screw is rotated as by gear means (not shown) in the housing 2 disposed rearward of the feed hopper 3. The reference numeral 4 denotes generally the die assembly through which the strip-fed rubber or plastic material is extruded after working and plasticizations.

Inside the cylinder assembly 1 is the cylinder 5 in which the feed screw 6 is rotatable in a counterclockwise direction as viewed in FIG. 2. As is well-known in the art, the feed screw 6 may be hollow for circulation of cooling medium therethrough to minimize sticking of the plastic material thereon, may be provided with a helical rib 7 of decreasing lead from the feed end toward the discharge end, or may be mounted for axial adjustment with respect to the cylinder 5 to provide an adjustable choke passage for throttling the flow of material and thus building up back pressure therein. Feed screws with such coolant passages, variable pitch feeding flights, varying hub diameters, and adjustable chokes, are disclosed, for example, in the following patents:

Allen L. Heston, 2,449,652, Sept. 21, 1948.
Hans E. Buecken, 2,574,907, Nov. 13, 1951.
Eugene E. Heston, 2,595,455, May 6, 1952 (Re. 23,880, Sept. 28, 1954).
Wilhelm A. Magerkurth, 2,639,464, May 26, 1953.
Edwin E. Mallory et al., 2,970,341, Feb. 7, 1961.

Also, as disclosed in the above-referred to patents, the cylinder bore 8 may be smooth, may be longitudinally serrated or threaded, or may be formed with various undercuts to provide mixing chambers in conjunction with threaded sections upstream and downstream of the undercuts.

Referring now more especially to FIGS. 2 and 3, the turning section 9 of the feed screw 6 which is exposed to the feed passage 10 in the cylinder 5 and feed box 3 is preferably cylindrical and may, if desired, be formed with longitudinal serrations, knurling, or like roughened surface 11 to grip the plastic material but without allowing leak-back of the material through the grooves of such serrations or knurling 11. Herein, the serrations 11 are of generally saw-tooth configuration to assist in carrying the material in passage 10 around with the feed screw 6. The section 9 may be appropriately termed a "turning" section since it does not tend to propel the plastic material axially but rather to turn it around therewith.

The feed passage 10 has opposite converging sides 12 and 13 and generally parallel or converging ends 14 and 15 intersecting the cylinder bore 8 as best shown in FIG. 2. The lower side 12, however, is tangent to, and in register with the inlet end of a helical channel 16 in the cylinder 5, said channel 16 being of hand opposite to that of the helical feeding rib 7 of the working and propelling section 17 of the feed screw 6. The opposite walls 18 and 19 of the channel 16 constitute continuations of the end walk 14 and 15 of the feed passage 10.

It is now apparent that when the feed screw 6 is rotated in a counterclockwise direction as viewed in FIG. 2, the material in the feed passage 10 of the feed hopper 3 will be wedged by the turning section 9 into the entrance of the helical channel 16 at the zone designated by the reference numeral 20. Because the channel 16 is left-hand (as contrasted with the right-hand feeding rib 7 of section 17), the turning material thus wedged into the feed hopper throat and channel inlet 20 will be carried around and axially advanced into the cylinder bore 8 to the axially offset working and propelling section 17 where the right-hand helical feeding rib 7 of the feed screw 6 commences. The material is thus forcefully and uniformly advanced from the feed hopper 3 to the working section 17 of the feed screw 6. Thereafter, as the feed screw 6 turns with respect to the body of the material emerging from the downstream end of the feed channel 16, the feeding rib 7 advances the material lengthwise through the cylinder 5 for extrusion through the die 4 for thus producing a uniformly high quality extruded product.

The channel 16 herein extends for approximately one full turn and is preferably of gradually decreasing radial depth (from maximum to zero) for the last quarter of its full turn. After about one fourth turn from the inlet zone 20, the leading wall of the channel 16 slopes as represented by reference numeral 19a to wedge the plastic material radially inwardly toward the working or propelling section 17 of the feed screw 6 and to lessen obstruction to axial movement of the turning material by the opposite, substantial radial trailing wall 18. Then, as the material is fed from the channel 16 to the propelling section 17, the rotation of the feed screw 6 with respect to the material effects working and propelling of the material through the cylinder 5 toward the die assembly 4. By reason of the radial cross-section area of the helical passage between the cylinder bore 8 and the hub 21 of the feed screw being less than the radial cross-section area of the channel 16, back presure will build up in the material for smooth and even flow to the working and propelling section 17.

In FIG. 4 a turning section is employed which will also exert a component of force on the working tending axially helically to advance the material as well as to rotate the material. Here the cylinder 5 including the helical channel 16 is identical in form to that of the FIG. 3 embodiment. However, the screw 30 is comprised of a single flight feed section 31 and a double flight turning section 32. The screw flight 33 may extend the length of the screw whereas the flight 34 of the same lead and pitch extends only to a point 35 adjacent the helical channel 16. Thus a helical flight turning section may be employed with the helical channel 16.

Other modes of applying the principle of the invention may be employed, change being made as regards the details described, provided the features stated in any of the following claims, or the equivalent of such, be employed.

I therefore particularly point out and distinctly claim as my invention:

1. An extruder comprising a cylinder having a feed passage for introduction of plastic and like material; and a feed screw rotatable in said cylinder having a single flight propelling section and a double flight turning section respectively effective, upon rotation of said feed screw, to axially advance material through said cylinder and to turn material in contact therewith; said cylinder having an internal helical channel around said turning section for conducting material turned by said turning section from said feed passage to said propelling section.

2. The extruder of claim 1 wherein the trailing end wall of said channel is substantially radial and the leading end wall, where surrounding said propelling section, is inclined so as to wedge the material radially inwardly into said propelling section.

3. An extruder comprising a cylinder having a bore intersected adjacent one end by a feed passage for introduction of plastic or like material thereinto; and a feed screw rotatable in said cylinder having a one helical rib propelling section and a two helical rib turning section; said cylinder having a helical channel around said turning section leading from said feed passage to said propelling section whereby material turned by said turning section is advanced through said channel and material introduced into said propelling section from said channel is axially advanced along said feed screw.

4. An extruder comprising a cylinder having a feed passage for introduction of plastic and like material; and a feed screw rotatable in said cylinder effective, upon rotation of said feed screw, axially to advance material through said cylinder and to turn material in contact therewith; said cylinder having an internal helical channel for conducting material turned by said feed screw from said feed passage axially into said cylinder, said feed screw including an additional flight in the region of said helical channel only.

5. The extruder of claim 4 wherein said helical channel is of uniform axial dimension adjacent said feed screw, and the trailing end wall of said channel is substantially radial and the leading end wall, where surrounding said propelling section, is inclined so as to wedge the material radially inwardly into said propelling section.

6. An extruder as set forth in claim 3 wherein said helical channel is of opposite hand from said two helical rib turning sections.

References Cited in the file of this patent

FOREIGN PATENTS

| | | |
|---|---|---|
| 840,596 | Germany | Apr. 24, 1952 |
| 521,109 | Italy | Mar. 25, 1955 |
| 1,079,002 | Germany | Apr. 7, 1960 |